United States Patent [19]

Toyabe et al.

[11] Patent Number: 5,415,849
[45] Date of Patent: May 16, 1995

[54] PROCESS FOR DISSOLVING USED CATALYST

[75] Inventors: Keiji Toyabe, Toukai; Kenji Kirishima, Katsuta; Haruo Shibayama, Toukai; Yuji Nakano, Toukai; Hisaaki Shimauchi, Toukai; Ichiro Matsunaga, Tokyo, all of Japan

[73] Assignee: Sumitomo Metal Mining Company Limited, Tokyo, Japan

[21] Appl. No.: 202,225

[22] Filed: Feb. 25, 1994

[30] Foreign Application Priority Data

Feb. 26, 1993 [JP] Japan ................. 5-061403
Feb. 15, 1994 [JP] Japan ................. 6-040502

[51] Int. Cl.$^6$ .......................... B01F 1/00; C22B 23/00; C22B 34/22; C01G 49/00
[52] U.S. Cl. ................... 423/150.2; 423/68; 423/53; 423/132
[58] Field of Search ............. 423/150.2, 658.5, 68, 423/53, 132; 156/664; 252/79.2; 502/27

[56] References Cited

U.S. PATENT DOCUMENTS

| | | | |
|---|---|---|---|
| 3,597,290 | 8/1971 | Naito et al. | 156/666 |
| 4,145,397 | 3/1979 | Toida et al. | 423/150.2 |
| 4,657,745 | 4/1987 | Hyatt | 423/150.2 |
| 4,721,606 | 1/1988 | Tilley | 423/150.2 |
| 4,863,884 | 9/1989 | Tasker et al. | 502/27 |
| 5,013,533 | 5/1991 | Howard et al. | 423/133 |

OTHER PUBLICATIONS

H. S. Nagarajaiah, "Recovery of Nickel from Spent Catalyst Obtained in Oil Hydrogenation Industry" in *Research & Industry*, vol. 13, Apr.–Jun., 1968, pp. 69–72.
R. N. Tiwari et al., "Factors Affecting the Recovery of Nickel Oxide–Alumina and Nickel Oxide–Silica Type Catalysts" in *Technology*, vol. 9, Nov. 2 & 3 (1972) pp. 134–138, no month.
P. R. Raisoni et al., "Leaching of Cobalt and Molybdenum . . . Sulphur Dioxide" in *Minerals Engineering*, vol. 1, No. 3 (1988) pp. 225–234, no month.
M. Stankovic, "Effect of pH . . . Spent Vanadium Catalysts" in *Hungarian Journal of Industrial Chemistry*, vol. 20 (1992) pp. 189–192, no month.
P. R. Raisoni et al., "Physicochemical Aspects . . . Using DMSO–SO$_2$ Mixed Solvent" in *Ind. Eng. Chem. Res.*, vol. 29, No. 1 (1990) pp. 14–21, no month.
B. W. Jong, "Recovery of Principal Metal Values From Waste Hydroprocessing Catalysts" in *Report of Investigations*, 9252, U.S. Dept. of Interior (1989) pp. 1–61, no month.
J. A. Bonucci et al., "Recovery of PGM from Automobile Catalytic Converters" in *Precious Met. Min. Extr. Process*, Proc. Int. Symp. (1984) pp. 463–481, no month.
R. F. Sebenik et al., "Recovery of Metal Values . . . and Preliminary Economics" in *Prepr.–Am. Chem. Soc., Div. Pet. Chem.* (1982), Sep., pp. 674–678.

*Primary Examiner*—Steven Bos
*Attorney, Agent, or Firm*—Watson, Cole, Grindle & Watson

[57] ABSTRACT

A process for dissolving used catalyst includes the steps of roasting, after subjecting to an optional deoiling treatment, the used catalyst at a temperature lower than 1,000° C. but not lower than the temperature at which any of the residual components in the used catalyst undergoes ignition and combustion where the residual components are selected from the group consisting of oils, sulfur components, and carbon components; and dissolving the roasted product using sulfuric acid after adding a metal to the roasted product as a catalyst for accelerating dissolution. The process provides a simple and efficient method for completely dissolving a used catalyst having a carrier containing alumina as the principal component.

11 Claims, No Drawings

PROCESS FOR DISSOLVING USED CATALYST

BACKGROUND OF THE INVENTION

1. Field of the Invention

The present invention relates to a process for dissolving used catalyst based on a carrier containing alumina as the principal component. More specifically, the present invention relates to a process for dissolving used catalyst which is designed for recovering valuables from catalysts which were previously used in refining petroleum and then discharged as wastes.

2. Prior Art

From the viewpoint of effective use of resources, numerous attempts for recovering valuables from wastes have been made to present. Among the wastes, those which are recovered as valuables are generally used as secondary materials, and those out of interest from the recovery cycle are treated as either non-industrial wastes or industrial wastes; i.e., they, for example, are subjected to incineration or are used in reclamation. The determination of whether a particular waste should be recovered or not depends on the so-called economical and social environments, but it largely depends also on the technological level achieved at that time.

Considering the case of used catalysts which are discharged in large amounts from a hydrodesulfurization process in refining oil, for instance, these used catalysts contain alumina, the main component of the catalysts; molybdenum, nickel, cobalt, and other active metal components; heavy metal components such as vanadium and sulfur components derived from the raw material treated by the catalyst; and the decomposition product derived from oil, such as carbon, which is produced as a result of hydrodesulfurization reaction. It has been demanded for a long time, therefore, to effectively recover the valuable metal components from the used catalysts.

At present, however, only vanadium and molybdenum are recovered from the used catalysts. Only a part of the components, e.g., alumina and valuable metals such as nickel and cobalt, is used as cement materials at best, and the rest is treated as waste and mainly used in reclamation.

The insufficient recovery of the used catalysts is a consequence of the fact that these used catalysts contain carbon, oil components, sulfur components, and the like in addition to the valuable metals. Moreover, the oil components are sometimes present in a considerably large amount. These carbon, oil, and sulfur components must be removed, for example by oxidation roasting, before recovering the valuable metals and the like. However, when subjected to oxidation roasting, alumina reacts with metals such as nickel and cobalt to form a stable metal aluminate (complex oxide) having a spinal structure. Otherwise, alumina itself undergoes phase transition to acquire a stable $\alpha\text{-}Al_2O_3$ (corundum) structure. Because the complex oxide and/or corundum has extremely poor reactivity with acids and alkalis, it is found substantially impossible to recover metals such as nickel and cobalt by using any dissolution process using an acid or an alkali.

Other methods for recovering nickel or cobalt include reduction dissolution process. This process is believed to dissolve 70% or more of nickel or cobalt. When this process is used for recovering nickel and cobalt, however, about 50% of the alumina carrier is dissolved at the same time. This considerably makes the process uneconomical, because a complicated post treatment is required to separate and recover each of the metal components. It has been also attempted to completely dissolve alumina to facilitate the recovery of the other metal components. Such proposed attempts include using a mixed acid or carrying out the dissolution under a high temperature and high pressure using an autoclave. These proposed methods are capable to dissolve about 90% of alumina, but yet insufficient for the achievement of complete dissolution.

SUMMARY OF THE INVENTION

In the light of the aforementioned circumstances, the present invention aims to overcome the problems which are encountered in the dissolution operation of used catalysts upon recovering valuables from them. Accordingly, the present invention provides a process for completely and efficiently dissolving used catalysts, which is essential in the process of recovering valuables from used catalysts containing alumina as the carriers.

DETAILED DESCRIPTION OF THE INVENTION

The process according to the present invention is characterized in that it comprises, optionally after subjecting a used catalyst to a deoiling treatment if necessary, roasting the used catalyst at a temperature lower than 1,000° C. but not lower than the temperature at which any of the residual components in the used catalyst undergoes ignition and combustion, wherein the components are selected from the group consisting of an oil, a sulfur component, and a carbon component, and wherein the roasting is preferably performed in the temperature range of from 400° to 700° C.; and dissolving the roasted product using sulfuric acid after adding a metal into the roasted product as a catalyst for accelerating dissolution. Preferably, the metal used as a catalyst for accelerating dissolution is at least one metal selected from the group consisting of aluminum, tin, copper, zinc, iron, nickel, cobalt, and magnesium, and is added at an amount equivalent to at least 0.2 times the amount necessary for reducing pentavalent vanadium ions to tetravalent vanadium ions. It is also preferred that the amount of sulfuric acid added to the roasted product is equivalent to that sufficient for converting the metal components in the roasted product into sulfates. The present invention is characterized also in that the used catalysts are those using carriers based on alumina.

The used catalysts to be referred herein are those using a carrier containing alumina as the principal component. The used catalyst may sometimes contain a large amount of an oil depending on the conditions at which the catalysts are discharged from a catalytic reaction apparatus. In such a case, the oil must be removed prior to the roast, because the presence of oil makes the control of the roast temperature difficult. Accordingly, oil is previously removed from the used catalyst to a substantially low level, so that no problem may be caused in the subsequent step of roasting.

The oil may be removed by washing the used catalyst using a highly volatile low molecular organic solvent, or by heating the used catalyst in a neutral or a non-oxidizing atmosphere to volatilize the oil component.

The process according to the present invention comprises roasting a used catalyst containing oil at a substantially low concentration that would cause no problem, at a temperature lower than 1,000° C. but not lower than the temperature at which any of the residual components, i.e., an oil, a sulfur component, and a carbon component, in the used catalyst undergoes ignition and combustion. The roast is effected for removing carbon, and for oxidizing the valuable metal remaining in the catalyst to recover the metals as oxides. As a matter of course, residual oil and sulfur remaining in small amounts are removed, or sulfur is converted into sulfuric acid.

The roast temperature is confined in the range above because the lower bound differs depending on the used catalysts to be treated; the type and kind of oil included in the used catalyst, the morphology of residual carbon, and the amount of sulfur differs from one catalyst to another. The upper bound is set to 1,000° C., because the oxidation reaction rate of carbon, valuable metals, and sulfur increases acceleratingly at temperatures over 1,000° C. A rapid oxidation reaction assures carbon, valuable metals, and sulfur to completely undergo the reaction, however, on the other hand, the metal oxides which easily volatilizes at high temperatures, such as those of molybdenum, tend to be scattered and remain unrecovered. Furthermore, the valuable metals undergo reaction with the alumina carrier and accelerate the formation of complex oxides. The formation of a complex oxide of alumina with a valuable metal greatly decreases the dissolution rate in the subsequent step, thereby resulting in a considerably low process efficiency when taking the entire process into account.

A roast at too low a temperature, however, lowers the oxidation reaction rate of the valuable metals, sulfur, etc., to consume much time. This is economically disadvantageous. By taking the energy cost and other factors into consideration, the roast is most preferably effected in the temperature range of from 400° to 700° C.

In the process according to the present invention, the roasted product is dissolved using sulfuric acid. The present invention is best characterized by this dissolution step. Accordingly, the important factors of the dissolution step, e.g., the metal used as a catalyst for accelerating dissolution, dissolution temperature, acid concentration, slurry concentration, and dissolution operation, are described below in further detail.

(1) Metals for Use as Catalysts for Accelerating Dissolution:

Oil was removed by evaporation from a used catalyst discharged from a petroleum plant by heating it at 250° C. in an external heating type rotary kiln while flowing nitrogen gas. The catalyst was then roasted by heating it again in the external heating type rotary kiln at 550° C. for a residence time of 2 hours. The resulting roasted product, whose composition is shown in Table 1, was mixed with a reducing agent, and the resulting mixture was dissolved into a 20% by weight sulfuric acid solution at 90° C. The amount of the roasted product used in the mixture, the type and amount of the reducing agent, the amount of sulfuric acid, and the attributes are listed in Table 2.

TABLE 1

|  | Al | Mo | V | Co | Ni | Fe | C | S |
|---|---|---|---|---|---|---|---|---|
| Composition of the Roasted Product | 27.4 | 6.5 | 5.3 | 2.5 | 2.2 | 0.2 | 1.0 | 1.6 |

(Unit: % by weight)

TABLE 2

| No. | Roasted Product (g) | Catalyst Metal Amount | | Sulfic Acid Amount (ml) | Redox Potential (mv) | pH |
|---|---|---|---|---|---|---|
|  |  | Metal | Amount (g) |  |  |  |
| 1 | 140 | — | — | 560 | 815 | 0.3 |
| 2 | 140 | Al | 2 | 560 | 94 | 0.5 |
| 3 | 140 | Sn | 2 | 560 | 211 | 0.2 |
| 4 | 140 | Cu | 2 | 560 | 285 | 0.4 |
| 5 | 140 | Zn | 2 | 560 | 725 | 0.2 |
| 6 | 140 | Fe | 2 | 560 | 402 | 0.5 |
| 7 | 140 | Ni | 2 | 560 | 267 | 0.5 |
| 8 | 140 | Co | 2 | 560 | 241 | 0.5 |
| 9 | 140 | Mg | 4 | 560 | 547 | 0.8 |

The metal catalyst for accelerating dissolution was added at an amount of 3% by weight with respect to the roasted product. Only magnesium was added twice the amount of the other metals, because the dissolution rate thereof was too high and it could not sufficiently exhibit the catalytic effect at an addition of 3% by weight. Accordingly, another 2 g of magnesium was added at 90 minutes after of the initial addition. The solution was subjected to the measurements of standard oxidation reduction potential (ORP) and pH value 90 minutes after the initiation of the reaction. The standard ORP was measured using an Ag/AgCl electrode, and the results are listed in Table 2 for reference.

The roasted product was sampled from time to time during the dissolution process to observe the dissolved state. In a case using aluminum as the catalyst metal for accelerating the dissolution, the roasted product was found to be completely dissolved upon passage of 60 minutes after the initiation of the reaction. In a case using tin, copper, zinc, nickel, or cobalt, complete dissolution of the roasted product was found 120 minutes after the initiation of the reaction. In using iron as the catalyst, the roasted product underwent a complete dissolution upon passage of 180 minutes after the initiation of the reaction.

However, in cases using no catalyst for accelerating the dissolution, only about 72% of alumina was found to be dissolved even after 180 minutes from the initiation of the reaction. Furthermore, magnesium was found to be rapidly consumed, because it is highly soluble to sulfuric acid. Thus, an additional portion of magnesium, which amount was equivalent to the initial amount, was added 90 minutes after the initiation of the reaction. This time again, the added portion was rapidly consumed in the reaction. Accordingly, the final dissolution of alumina in this case was found to be about 83%. Moreover, in the case using no catalyst for accelerating the dissolution, the dissolution rate of alumina remained almost unchanged 90 minutes or longer after the initiation of the reaction. This is in clear contrast with the case using magnesium as the catalyst, because the dissolution rate in this case increases with increasing the amount of addition. Assumably, alumina would be completely dissolved by adding another 2-g portion of magnesium. In Table 3 are given the dissolved amount for each of the metals after passage of 180 minutes from the initiation of the reaction.

TABLE 3

|  | Al | Sn | Cu | Zn | Fe | Ni | Co |
|---|---|---|---|---|---|---|---|
| Dissolved Amount of Each of the | 0.5 | 0.46 | 1.04 | 2.0 | 2.0 | 1.0 | 0.9 |

TABLE 3-continued

|       | Al | Sn | Cu | Zn | Fe | Ni | Co |
|-------|----|----|----|----|----|----|----|
| Metals |   |    |    |    |    |    |    |
| (Unit: g) | | | | | | | |

It can be seen from Table 2 that the solution obtained after the complete dissolution of the roasted product yields a pH value of 4 or lower and an ORP of 1 V or lower. These values for pH and ORP are about the same as those obtained in the case using sodium sulfite according to a conventional reduction extraction process. This signifies that the reaction mechanism according to the process of the present invention cannot be explained by simply relating pH values with ORP values. The function of the catalyst metals for accelerating the dissolution is yet to be clarified, but hydrogen, which is generated on dissolving said catalyst metal into a mineral acid, is believed to play an important role in the dissolution reaction of the roasted product.

Said catalyst metals are not only favorable for accelerating the dissolution of the valuable metals and alumina carrier of the used catalyst, but also for the effective use of metal scraps which generate as industrial wastes. The use of these metal scraps are further advantageous because they are available at low cost. Considering the reaction rate in dissolution, the amount necessary as the catalyst, and the pollution of the solution by the addition of foreign matter, aluminum is most preferred among the metals enumerated above as the catalysts for accelerating the dissolution.

(2) Dissolution Temperature:

The dissolution step in the process according to the present invention is generally effected at 70° C. or higher. In the strict sense, the temperature at which the dissolution is effected depends on the concentration of the acid used in the step. In general, however, the dissolution lowers at a temperature lower than 70° C. to result in an insufficient dissolution of the used catalyst. On the other hand, the dissolution of the used catalyst is accelerated at higher temperatures because the rate of dissolution increases with elevating temperature of the solution. However, the amount of the catalyst metal used for accelerating the dissolution also increases with elevating temperature. This leads to the consumption of catalyst metals and sulfuric acid in large amounts, thereby resulting in an uneconomical process and in an inferior operation environment. Moreover, only limited kinds of material can be used in the apparatus for use in such a process. In most of the cases, heating for keeping the temperature constant is unnecessary once after the initiation of the reaction, because the dissolution reaction is exothermic.

(3) Acid Concentration:

The concentration of the acid used is not limited in the process according to the present invention. However, if the heat of reaction between sulfuric acid and the roasted product or the metal is to be utilized and if a higher reaction rate is desired, the concentration of sulfuric acid is preferably set as high as possible. An excessively high sulfuric acid concentration, however, is not preferred. By taking the above points into consideration, the use of a sulfuric acid solution at a concentration in the range of from 10 to 30% by weight is preferred.

(4) Operation of Dissolution:

The mode of operating the dissolution is not particularly limited, however, the valuable metals and the alumina carrier in the used catalyst can be efficiently dissolved by, for example, effecting a parallel-flow or a counter-flow dissolution, and sequentially or continuously recovering the resulting homogeneous solution. Otherwise, a batch-type reaction cell equipped with a stirrer may be used as well.

The present invention is illustrated in greater detail referring to non-limiting examples below. It should be understood, however, that the present invention is not to be construed as being limited thereto.

EXAMPLE 1

(1) Preparation of Roasted Product

The alumina-based carrier, to which the process according to the present invention is applied, is discharged from a hydrodesulfurization reaction tower in two cases; in a first case the carrier is discharged after being subjected to deoiling, and in a second case the carrier is discharged as it is without being subjected to deoiling. Accordingly, roasted products were produced using (A) a used catalyst discharged after deoiling treatment, and (B) a used catalyst discharged as it is and containing heavy oil in a large amount.

The used catalyst (A) was supplied to a rotary roasting furnace equipped with a quartz tube, and controlled in such a manner that the feed may reside in the heating portion for a duration of two hours. Thus, samples each 1.5 kg in weight were obtained by varying the temperature of the heating portion to 250° C. (sample A1), 400° C. (A2), 500° C. (A3), 600° C. (A4), 650° C. (A5), 700° C. (A6), and 1,000° C. (A7).

The composition of each of the roasted products A1, A2, A3, A4, A5, A6, and A7 is given in Table 4 below.

TABLE 4

| Roasted Product Components | V | Mo | Ni | Al | P | S | C | Na | Fe | Co |
|---|---|---|---|---|---|---|---|---|---|---|
| A1 | 2.14 | 4.52 | 2.12 | 24.2 | 0.15 | 5.27 | 29 | 0.08 | 0.23 | 1.10 |
| A2 | 3.10 | 6.66 | 3.03 | 35.5 | 0.24 | 1.60 | 3.80 | 0.09 | 0.10 | 1.22 |
| A3 | 3.14 | 6.59 | 3.14 | 36.4 | 0.22 | 1.46 | 0.56 | 0.10 | 0.35 | 1.25 |
| A4 | 3.04 | 6.50 | 3.25 | 37.3 | 0.23 | 1.21 | <0.1 | 0.09 | 0.37 | 1.22 |
| A5 | 3.22 | 6.72 | 3.32 | 38.2 | 0.25 | 0.32 | <0.1 | 0.09 | 0.39 | 1.23 |
| A6 | 3.21 | 6.85 | 3.30 | 37.3 | 0.24 | 1.10 | <0.1 | 0.11 | 0.44 | 1.31 |
| A7 | 3.20 | 4.21 | 3.30 | 38.2 | 0.24 | <0.1 | <0.1 | 0.09 | 0.38 | 1.23 |

(Unit: % by weight)

Table 4 reads that the carbon and sulfur content of the roasted product can be lowered to a sufficiently low level by setting the roast temperature to 400° C. or higher.

When the roasting is effected at 1,000° C., a temperature far exceeding the melting point of vanadium pentaoxide, i.e., 690° C., the roasted product unfavorably forms a sintering. A roast temperature as high as 1,200° C. is not preferred, though not referred in the present example, because vanadium and molybdenum undergo vigorous volatilization.

Then, used catalyst (B) was subjected to roast test using a roasting furnace similar to that used above. However, the roasted product obtained at 300° C. or lower contained oil in too large an amount, and generated oil in a large amount in the subsequent dissolution treatment. It was therefore obvious that the product was not suitable for use in the dissolution treatment.

Furthermore, the roasted product obtained from used catalyst (B) was subjected to roast at a temperature of 400° C. or higher. However, the oil contained in the used catalyst underwent combustion, and the temperature was therefore left beyond control. Conclusively, it was found that a catalyst containing oil in a high content, such as the used catalyst (B), must be previously subjected to a pretreatment for removing oil therefrom, for example, heating the catalyst in a nitrogen gas flow, or washing it using a low-boiling organic solvent.

(2) Dissolution Test using Sample A3:

A 140 g portion of the sample A3, together with metal aluminum sheet cut into rectangular strips as a catalyst for accelerating dissolution, was charged into a 2000-ml volume separable flask equipped with a condenser, and 500 ml of a 20% by weight sulfuric acid solution was added therein. The mixture was then allowed to undergo dissolution reaction by immersing the entire separable flask into a thermostat set previously at 90° C. to allow. Because the dissolution reaction is exothermic, the temperature of the thermostat which had been set previously was slightly lowered on the initiation of the reaction. If necessary, distilled water is added to cool the cell, thereby maintaining the temperature of the solution inside the separable flask to a constant value of 90° C.

The total volume of the solution upon completion of the reaction was found to be 1,000 ml. The concentration of each of the metallic components of the solution was measured every predetermined duration of time to confirm the progress of dissolution. It was confirmed thereby that the roasted product was completely dissolved about 45 minutes after the initiation of the reaction.

Upon completion of the reaction, the content inside the separable flask was transferred into a beaker, and the residue of metallic aluminum and a trace amount of powder were removed therefrom. The concentration of each of the metal components of the solution after completion of the reaction is given in Table 5.

TABLE 5

| | V | Mo | Ni | Al | Fe | Co |
|---|---|---|---|---|---|---|
| Concentration of Metal Components | 4.40 | 9.22 | 4.40 | 51.5 | 0.49 | 1.75 |

(Unit: g/l)

The powder which was present in trace amount was found to be carbon. The pH value and the standard oxidation reduction potential (measured using an Ag/AgCl electrode) of the resulting solution were found to be 0.3 and about 0.4 V, respectively.

The amount of aluminum which contributed to the dissolution reaction was calculated from the metallic aluminum residue. As a result, it was found that aluminum used as the catalyst for accelerating dissolution was equivalent to 0.3 times the amount necessary for reducing a pentavalent vanadium ion to a tetravalent vanadium ion.

It can be seen from the above results that the roasted product obtained at a roast temperature of 500° C. can be completely dissolved by employing the process according to the present invention.

EXAMPLES 2 AND 3

The roasted product A3 was dissolved according to the process described in Example 1, "(2) Dissolution Test Using Sample A3", except for changing the concentration of the sulfuric acid to 10% by weight (Example 2) or 20% by weight (Example 3).

In the case of Example 2, the roasted product A3 was found to be completely dissolved 90 minutes after the initiation of the reaction. Only trace amount of carbon powder was left over. Similarly in Example 3, the roasted product A3 was completely dissolved in 60 minutes. The pH values of the solution obtained as a result were found to be 3.8 for the case of Example 2 and 2.0 for Example 3. The standard oxidation reduction potential values as measured using Ag/AgCl electrode were found to be about 0.3 V for the case of Example 2 and 0.35 V for Example 3.

The amount of aluminum contributed to the dissolution reaction was calculated from the metallic aluminum residue. In both Examples, it was found that aluminum used as the catalyst for accelerating dissolution was equivalent to 0.2 times the amount necessary for reducing a pentavalent vanadium ion to a tetravalent vanadium ion. It can be seen that the amount of aluminum contributed to the dissolution reaction in Examples 2 and 3 is less than that of Example 1. This is assumably because the dissolution reaction was stopped at the point dissolution was completed.

It can be seen from the above results that the roasted product obtained at a roast temperature of 500° C. can be completely dissolved by employing the process according to the present invention.

EXAMPLES 4 AND 5

The roasted product A3 was dissolved according to the process described in Example 1, "(2) Dissolution Test Using Sample A3", except for changing the dissolution temperature to 70° C. (Example 4) or 100° C. (Example 5). The dissolution reaction was found to occur vigorously in Example 5, and though some difficulties were encountered in temperature control, the temperature was not completely out of control.

The dissolution was found to occur rapidly in both Examples. A duration of about 45 minutes or little longer was sufficient for the complete dissolution of the roasted product A3 in the case of Example 4, and about 30 minutes or little longer was sufficient for the case of Example 5. In both cases, only a little amount of carbon was left over. The pH values for the resulting solutions were found to be about 0.3 V for both cases, and the standard oxidation reduction potential values as measured using a Ag/AgCl electrode were found to be about 0.4 V for both Examples.

The amount of aluminum which contributed to the dissolution reaction was calculated from the metallic aluminum residue. In both Examples, it was found that aluminum used as the catalyst for accelerating dissolution was equivalent to 0.2 times the amount necessary for reducing a pentavalent vanadium ion to a tetravalent vanadium ion. It can be seen that the amount of aluminum contributed to the dissolution reaction in Examples 2 and 3 is less than that of Example 1. This is assumably because the dissolution reaction was stopped at the point dissolution was completed.

It can be seen from the above results that the roasted product obtained at a roast temperature of 500° C. can be completely dissolved by employing the process according to the present invention.

the case of Comparative Example 3, the reaction was found to occur too sluggishly and therefore not suitable for a practical use. Again this time, the test was stopped before the completion of dissolution.

A used catalyst was roasted at 1,200° C. to obtain a roasted product having a composition as shown in Table 6.

TABLE 6

|  | V | Mo | Ni | Al | P | S | C | Na | Fe | Co |
|---|---|---|---|---|---|---|---|---|---|---|
| Components of Roasted products | 3.02 | 1.50 | 3.33 | 38.0 | 0.22 | <0.1 | <0.1 | 0.09 | 0.36 | 1.26 |

(Unit: % by weight)

EXAMPLES 6 TO 11

The dissolution process according to the process described in Example 1, "(2) Dissolution Test Using Sample A3" was conducted except for using, in the place of the roasted product sample A3, sample A1 (Example 6), sample A2 (Example 7), sample A4 (Example 8), sample A5 (Example 9), sample A6 (Example 10), and sample A7 (Example 11). All the samples were found to dissolve completely leaving over carbon residues. As a matter of course, a considerable amount of carbon residue was found in Example 6, but little amount of carbon was found for the rest of the samples. The roasted product A7 used in Example 11 was obtained as a sintering, but was favorably dissolved without any problem.

Each of the solutions obtained in the Examples above was analyzed. As a result, their composition was found to contain 3.0 to 4.0 g/l of vanadium, 5.9 to 9.6 g/l of molybdenum, 3.0 to 4.7 g/l of nickel, 34 to 54 g/l of aluminum, 0.14 to 0.62 g/l of iron, and 1.54 to 1.83 g/l of cobalt.

The amount of aluminum contributed to the dissolution reaction was calculated from the metallic aluminum residue. As a result, it was found that aluminum used as the catalyst for accelerating dissolution was equivalent to 0.2 to 0.25 times the amount necessary for reducing a pentavalent vanadium ion to a tetravalent vanadium ion.

It can be seen from the above results that the roasted product obtained at a roast temperature of 500° C. can be completely dissolved by employing the process according to the present invention.

COMPARATIVE EXAMPLE 1

The roasted product A3 was dissolved according to the process described in Example 1, "(2) Dissolution Test Using Sample A3", except for changing the concentration of the sulfuric acid to 7% by weight. However, the roasted product A3 was found to be dissolved only incompletely. The pH value of the solution obtained as a result was about 4, and the standard oxidation reduction potential value as measured using a Ag-/AgCl electrode was about 0.3 V.

COMPARATIVE EXAMPLES 2 AND 3

The roasted product A3 was dissolved according to the process described in Example 1, "(2) Dissolution Test Using Sample A3", except for changing the dissolution temperature to 120° C. (Comparative Example 2) or 50° C. (Comparative Example 3). The dissolution reaction was found to occur too vigorously at 120° C., thereby the temperature was completely out of control. Further continuation of the dissolution test was found dangerous; hence, the test was stopped immediately. In The resulting roasted product was dissolved according to the process described in Example 1, "(2) Dissolution Test Using Sample A3" to find complete dissolution to occur while leaving over a carbon residue.

The solution thus obtained by dissolution above was analyzed. As a result, it was found to contain 4.23 g/l of vanadium, 2.10 g/l of molybdenum, 4.66 g/l of nickel, 53.2 g/l of aluminum, 0.5 g/l of iron, and 1.76 g/l of cobalt. It can be seen that molybdenum is present at considerably low concentration.

The result above shows that no problem occurs in the dissolution of the product obtained by roasting at 1,200° C., but that a considerable amount of molybdenum and vanadium is lost by vaporization at a temperature as high as 1,200° C. It is therefore obvious that roasting at high temperatures is not favorable from the economical viewpoint.

COMPARATIVE EXAMPLE 4

The roasted product A3 was dissolved according to the process described in Example 1, "(2) Dissolution Test Using Sample A3", except for adding metallic aluminum at an amount equivalent to 0.15 times the amount necessary for reducing a pentavalent vanadium ion to a tetravalent vanadium ion.

The dissolution was found to occur only incompletely; only about two thirds of the initial roasted product A3 was dissolved. The pH value of the solution obtained as a result was about 4, and the standard oxidation reduction potential value as measured using a Ag-/AgCl electrode was about 0.3 V.

It can be seen from the foregoing description that the present invention provides a simple and efficient process for completely dissolving used catalyst. Thus, the process according to the present invention is of great use for the industry.

While the invention has been described in detail and with reference to specific embodiments thereof, it will be apparent to one skilled in the art that various changes and modifications can be made therein without departing from the spirit and scope thereof.

What is claimed is:

1. A process for dissolving a used catalyst having alumina as a principle component, said process comprising the steps of:

roasting a used catalyst having alumina as a principle component and containing selected vanadium, molybdenum, nickel, iron and cobalt at a temperature lower than 1,000° C. but not lower than a temperature at which residual components in the used catalyst undergo ignition and combustion, to form a roasted product, wherein said residual components are selected from the group consisting of an oil, a sulfur component, and a carbon component;

adding at least one metal selected from the group consisting of aluminum, tin, copper, zinc, iron, nickel, cobalt and magnesium to the roasted product in an amount sufficient for accelerating dissolution of the roasted product; and then dissolving the roasted product in sulfuric acid.

2. A process for dissolving a used catalyst as claimed in claim 1, further including the step of removing oil from the used catalyst prior to said step of roasting.

3. A process for dissolving a used catalyst as claimed in claim 2, wherein the step of removing oil from the used catalyst prior to roasting comprises heating the used catalyst under a neutral or a non-oxidizing atmosphere to volatilize oil in said used catalyst.

4. A process for dissolving a used catalyst as claimed in claim 1, wherein the roasting is effected in the temperature range of from 400° to 700° C.

5. A process for dissolving a used catalyst as claimed in claim 2, wherein the roasting is effected in the temperature range of from 400° to 700° C.

6. A process for dissolving a used catalyst as claimed in claim 1, wherein the metal added for accelerating dissolution is aluminum.

7. A process for dissolving a used catalyst as claimed in claim 2, wherein the metal added for accelerating dissolution is aluminum.

8. A process for dissolving a used catalyst as claimed in claim 6, wherein the amount of the metal added for accelerating dissolution is equivalent to at least 0.2 times an amount necessary for reducing pentavalent vanadium ions in said used catalyst to tetravalent vanadium ions.

9. A process for dissolving a used catalyst as claimed in claim 7, wherein the amount of the metal added for accelerating dissolution is equivalent to at least 0.2 times an amount necessary for reducing pentavalent vanadium ions in said used catalyst to tetravalent vanadium ions.

10. A process for dissolving a used catalyst as claimed in claim 1, wherein the concentration of the sulfuric acid is from 10 to 30% by weight.

11. A process for dissolving a used catalyst as claimed in claim 2, wherein the concentration of the sulfuric acid is from 10 to 30% by weight.

* * * * *